United States Patent
Carr

(10) Patent No.: US 7,694,152 B2
(45) Date of Patent: Apr. 6, 2010

(54) MEMORY CONTROLLER WITH PERFORMANCE-MODULATED SECURITY

(75) Inventor: Jeffery Dean Carr, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 1464 days.

(21) Appl. No.: 11/050,290

(22) Filed: Feb. 3, 2005

(65) Prior Publication Data

US 2006/0174137 A1 Aug. 3, 2006

(51) Int. Cl.
*H04L 9/00* (2006.01)
(52) U.S. Cl. .................... 713/189; 713/166
(58) Field of Classification Search .............. 711/154, 711/158, 163, 167; 713/153, 189, 194, 164, 713/165, 166, 193
See application file for complete search history.

(56) References Cited

U.S. PATENT DOCUMENTS

| | | | | |
|---|---|---|---|---|
| 5,475,758 A * | 12/1995 | Kikuchi | | 713/156 |
| 5,825,878 A * | 10/1998 | Takahashi et al. | | 713/190 |
| 6,028,931 A * | 2/2000 | Kim | | 713/193 |
| 6,081,597 A * | 6/2000 | Hoffstein et al. | | 380/28 |
| 6,108,583 A * | 8/2000 | Schneck et al. | | 700/9 |
| 6,298,137 B1 * | 10/2001 | Hoffstein et al. | | 380/30 |
| 6,687,745 B1 * | 2/2004 | Franco et al. | | 709/219 |
| 6,795,938 B2 * | 9/2004 | Harris et al. | | 714/42 |
| 6,907,123 B1 * | 6/2005 | Schier | | 380/28 |
| 6,920,154 B1 * | 7/2005 | Achler | | 370/477 |
| 7,013,133 B2 * | 3/2006 | Hayduk | | 455/419 |
| 7,132,947 B2 * | 11/2006 | Clifford et al. | | 340/572.3 |
| 7,313,234 B2 * | 12/2007 | Takagaki et al. | | 380/28 |
| 7,412,579 B2 * | 8/2008 | O'Connor et al. | | 711/163 |
| 7,418,561 B2 * | 8/2008 | Kahn et al. | | 711/154 |
| 2003/0005024 A1 * | 1/2003 | Grumann | | 709/102 |
| 2003/0140161 A1 * | 7/2003 | Hayduk | | 709/232 |
| 2003/0197611 A1 * | 10/2003 | Clifford et al. | | 340/572.1 |
| 2004/0105546 A1 * | 6/2004 | Chernyak et al. | | 380/259 |
| 2004/0107345 A1 * | 6/2004 | Brandt et al. | | 713/171 |
| 2004/0122952 A1 * | 6/2004 | Kistler et al. | | 709/227 |
| 2004/0136533 A1 * | 7/2004 | Takagaki et al. | | 380/255 |
| 2004/0139339 A1 * | 7/2004 | Yeh et al. | | 713/193 |
| 2005/0219611 A1 * | 10/2005 | Yamashita et al. | | 358/1.15 |
| 2006/0002555 A1 * | 1/2006 | Lekatsas et al. | | 380/269 |
| 2006/0059345 A1 * | 3/2006 | Fayad et al. | | 713/173 |
| 2006/0107072 A1 * | 5/2006 | Umezu et al. | | 713/193 |
| 2006/0149917 A1 * | 7/2006 | O'Connor et al. | | 711/173 |

FOREIGN PATENT DOCUMENTS

JP 2001312486 * 11/2001

* cited by examiner

*Primary Examiner*—Beemnet W Dada
(74) *Attorney, Agent, or Firm*—Martin & Associates, LLC

(57) ABSTRACT

A memory controller utilizing a performance monitor to modulate the level of data security applied to the data being transferred to and from memory depending on the performance. The performance monitor tracks the response time for access to the memory over a defined time window. The response times are then compared to a predefined allowable response time. This comparison is done over a predefined window of time. When the actual response times exceed the allowable limits, the level of encryption is limited until performance parameters fall within the limits selected. The frequency with which the encryption mechanism is adjusted may also be predefined. Data transfers continue as the controller monitors system performance and controls the level of security applied to the data according to that performance data. The performance modulation can be different depending on what unit is accessing memory in multi-unit systems.

20 Claims, 4 Drawing Sheets

US 7,694,152 B2

MEMORY CONTROLLER WITH PERFORMANCE-MODULATED SECURITY

BACKGROUND OF THE INVENTION

1. Technical Field

This invention generally relates to computer memory systems, and more specifically relates to a memory controller for a computer system.

2. Background Art

In a closed memory subsystem of a computer data system, data may be accessed by a variety of units over a common memory bus. Security of data is such a system can be a concern. Mechanisms to encrypt data have been used but always at the sacrifice of performance. Depending on the encryption scheme used, the latency and performance degradation of data transfer through that unit can be substantial.

Prior art solutions do not address the concerns of both performance and data protection. The prior art memory controller systems either provide controls to maintain security of the data or they control performance on the interface, but not both. Performance degradation caused by security encryption and decryption by one unit on the bus can lead to more serious performance bottlenecks as other logic units on the bus are delayed access to memory.

Without a means for securing data while maintaining preferred performance characteristics, by regulating the security controls based on performance parameters collected on the interface to memory, computer systems will be required to trade off security and performance in a memory system.

DISCLOSURE OF INVENTION

The memory controller described herein utilizes a performance monitor to modulate the level of data security applied to the data being transferred to and from memory depending on performance parameters collected on the interface to memory. The monitor tracks the response time for access to the memory over a defined time window. The response times (or wait times) are then compared to pre-loaded allowable wait time. This comparison is also done over a predefined window of time. When the actual response times exceed the allowable response time limits, the level of encryption is limited until performance parameters fall within the limits selected by the host processor. The frequency with which the encryption mechanism is adjusted is also selectable and predefined by the host processor. Data transfers continue as the controller monitors system performance and controls the level of security applied to the data according to that performance data. The performance modulation can be different depending on what unit is accessing memory in multi-unit systems.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Embodiments of the memory controller described herein utilize a performance monitor in conjunction with a memory controller to modulate the level of data security applied to the data being transferred to and from memory depending on memory performance. As the logic units and/or processor access memory, the monitor tracks the response time for each memory transfer over a defined time window. The response times are then compared to predefined allowable response times for each unit. This comparison is done over an also predefined window of time and as the actual wait times exceed the units' response time limits, the level of encryption is limited until performance parameters fall within the limits selected by the host processor.

The frequency with which the encryption mechanism is adjusted is also selectable and pre-loaded by the host processor. This limiter function then controls the amount of data encryption that takes place within the encryption path by controlling the number of paths (passes) that the data goes through before getting written to memory. These paths, along with address generation for the encryption arrays, and random coefficients combine to make up the encryption algorithm. As the data is encrypted, all parameters used to encrypt that data are stored so that as data is then to be read from memory and be decrypted, those parameters can be used to reproduce the original data. Transfers then continue as the controller continues to monitor system performance and control the level of security applied to the data according to that performance data.

Figure 1:
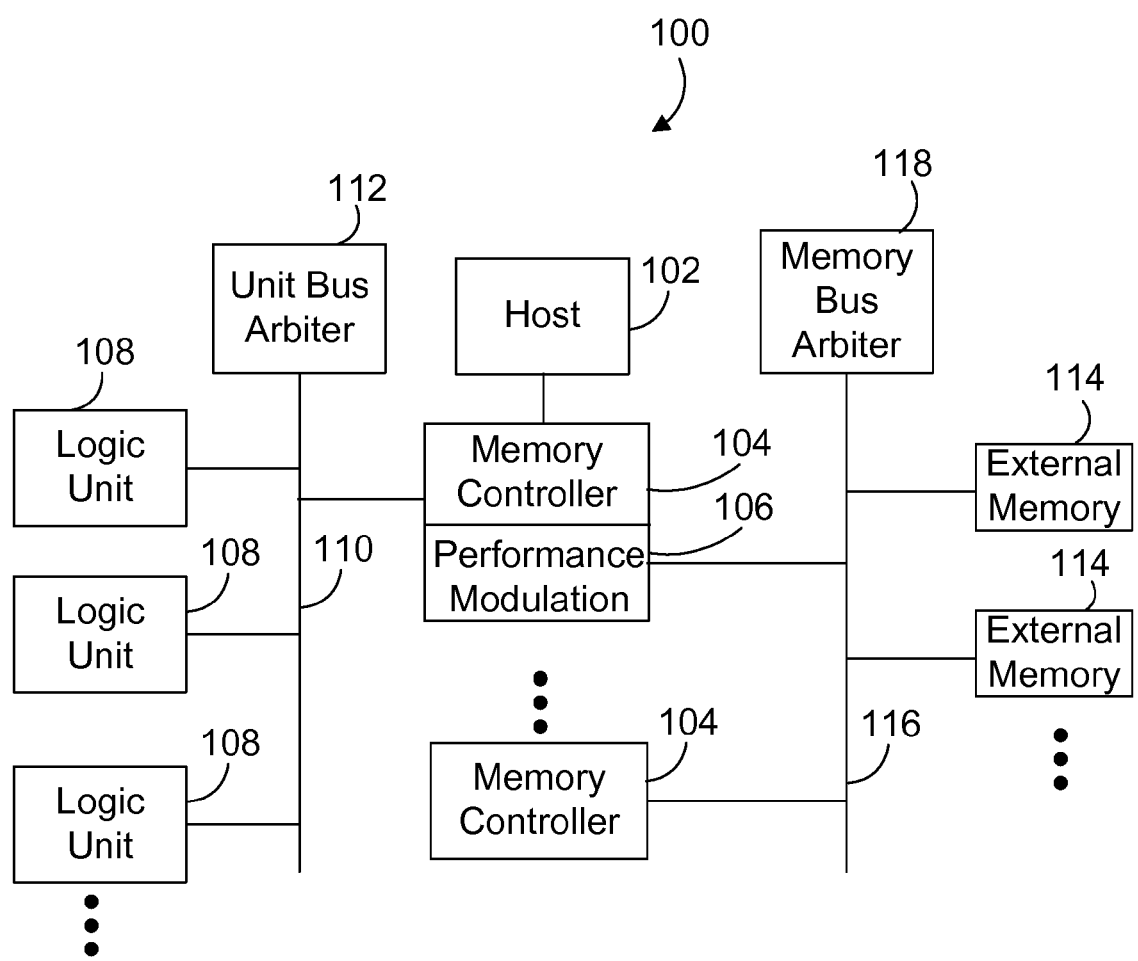
FIG. 1 is a block diagram of a system with a memory controller having modulated performance in accordance with the preferred embodiments.

FIG. 1 shows a top level block diagram of a computer system 100 with a host processor 102 and a memory controller 104 having a performance modulation circuit 106. The memory controller 104 connects the host 102 and one or more logic units 108 on a unit bus 110. The unit bus 110 is controlled by a unit bus arbiter 112. For any transfer from an logic unit 108 to or from external memory 114, the logic unit 108 will make a request to the unit bus arbiter 112, which will grant access to the bus, based on its own priority scheme for multiple requesters. As a logic unit 108 is granted access it then carries out that transfer via the internal memory controller 104 to access external memory 114. Access to the external memory 114 is done over the memory bus 116 which is controlled by the memory bus arbiter 118.

The topography of FIG. 1 is only an example of a computer system that may use the invention described further below. The memory bus may include multiple external memory blocks 114 as shown. Further, the host 102 may be connected as one of the units on the unit bus. In another variation, the host 102 could be the only logical unit connected to the memory controller and there would be no need for a unit bus, or unit bus arbiter. Other variations would also be recognized by those skilled in the art and are expressly contemplated in the present claimed invention.

Figure 2:
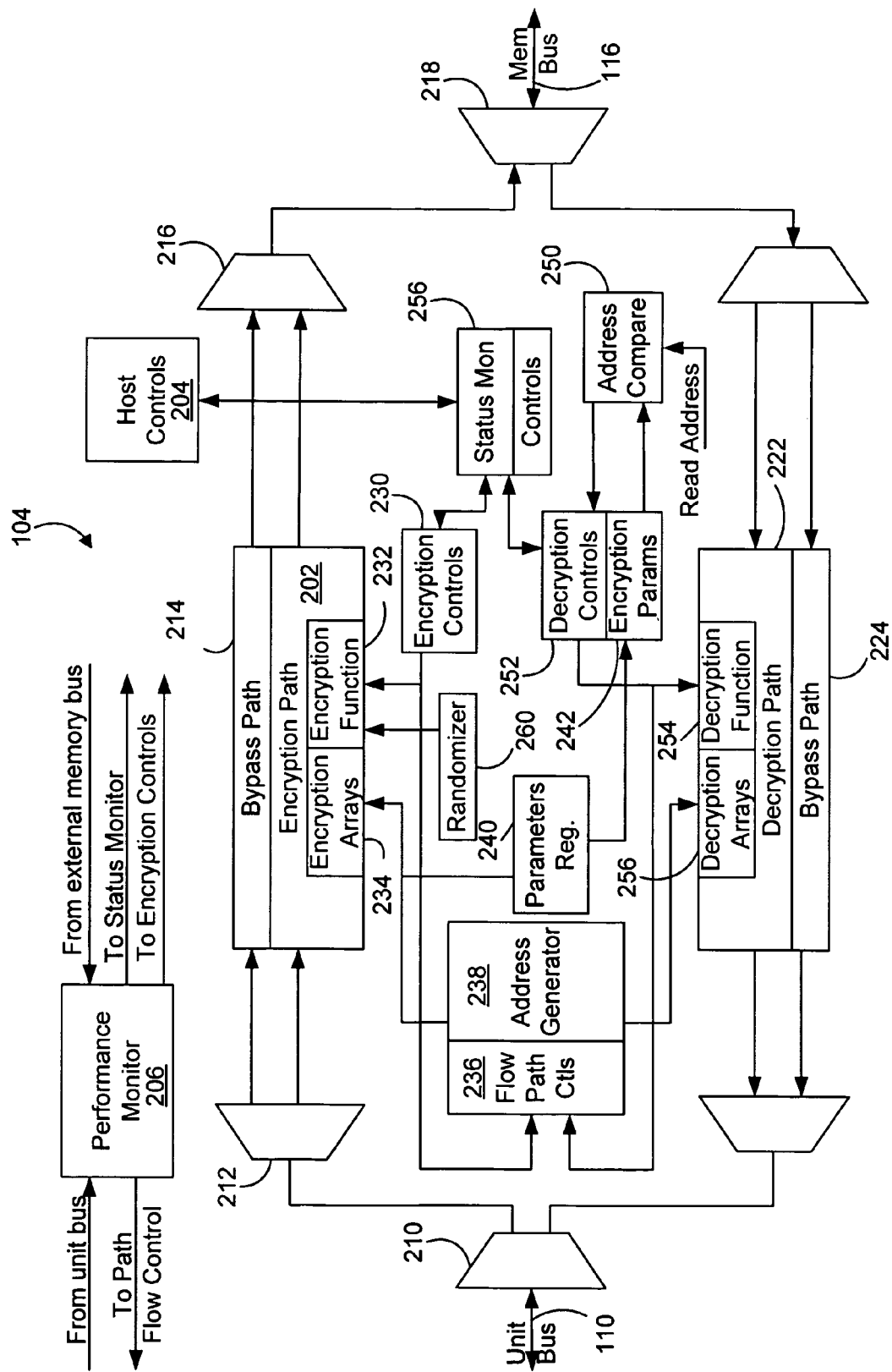
FIG. 2 is a block diagram showing the structure of the memory controller of FIG. 1.

FIG. 2 describes further detail of the memory controller 104 introduced in FIG. 1 according to a preferred embodiment. When data from a unit 108 (FIG. 1) or the host 102

(FIG. 1) is required to be encrypted, the memory controller 104 encrypts that data and stores all the parameters used in the encryption and thereby those that would be necessary to decrypt that same data when it is read back from memory. The encryption of data is carried out by passing data thru the encryption path 202 shown in FIG. 2. Data enters the memory controller from the unit bus 110. Data multiplexers 210 and 212 are used to route the data to the encryption path 202. When encryption is not necessary, data is routed through the bypass path 214. The combination of the encryption path 202 and the bypass path 214 is a store path from a unit or processor on the unit bus 208 to the external memory 114. Data multiplexers 216 and 218 are used to route the data from the encryption path 202 or the bypass path 214 to the external memory bus 116. Similarly, data passing back through the memory controller 104 is routed from the external memory bus 116 through decryption path 222 or bypass path 224 and out on the unit bus 110. The combination of the decryption path 222 and the bypass path 224 is a read path from the external memory 114 to the unit or processor on the unit bus 110.

The encryption controls 230 control the encryption function 232 which includes logic to perform encryption on the data in conjunction with the encryption arrays 234. Further detail of the encryption is provided with respect to FIG. 3 below. The flow path controls 236 and the address generator 238 receive control input from the encryption controls 230 to generate flow paths and addresses for the encryption arrays 234. As the encryption controls 230 and encryption function 232 process data thru the encryption path 202, they will store the address range where the data is to be stored in memory, the addresses used in the encryption arrays, the path used through those arrays, and the algorithm coefficient used in the shift register 312 (shown in FIG. 3). All of these parameters are pipelined through the encryption parameters register 240, and then stored in the encryption parameters array 242.

The address compare block 250 shown in FIG. 2 is responsible for determining whether the address being read from external memory was encrypted when it was written to memory. When the memory controller 104 reads from the external memory bus 116, the address compare unit 250 compares the address of the data to addresses stored in the encryption parameters array 242. If the address being read from memory falls within a stored address (an address range for data that has been encrypted), then the data being read from memory will require decryption using the stored parameters also in the encryption parameters array 242. As the encrypted data is read back from memory, the decryption controls 252 and decryption function 254 then use the parameters stored during the encryption process to decrypt the data. The decryption process is essentially the reverse of the encryption process described above and described in more detail below. In the decryption process the decryption controls 252 controls the decryption function 254 on the data in conjunction with the decryption arrays 256.

FIG. 2 further illustrates the randomizer 260. The randomizer 260 provides a random input to the encryption function to allow the encryption function to select a random path through the flow control stages. Multiple random paths through the flow control stages provide an increased level of encryption. The randomizer 260 also provides a random shift value for the algorithm coefficient shifter 312 described below.

The host processor 102, shown in FIG. 1, is given control of the memory controller 104 through the host controls block 204 and its interfaces. The host will control the loading of the encryption and decryption arrays via the array load register (not shown). The host may also control which units have what priority on the unit bus 110 and can also control which data is to be encrypted.

The level or amount of encrypted security placed on that data is controlled by the memory controller 104, based on its input from the host 102 through the host controller 204 and the performance monitor controls 206. See below for more detail on the performance monitor and controls in the description of FIG. 4.

The preferred embodiment of the memory controller further includes a status monitor 256 as shown in FIG. 2. The performance monitor 206, the encryption function 232, and the decryption function 254 communicate with the status monitor the current status of each function so that the status monitor can relay status information back to the host through the host controls. This communication is shown in FIG. 2 through the encryption controls 230 and decryption controls 252. The host is then able to continuously re-evaluate and refine its controls over the memory controller to improve functionality and performance for each iteration.

Figure 3:
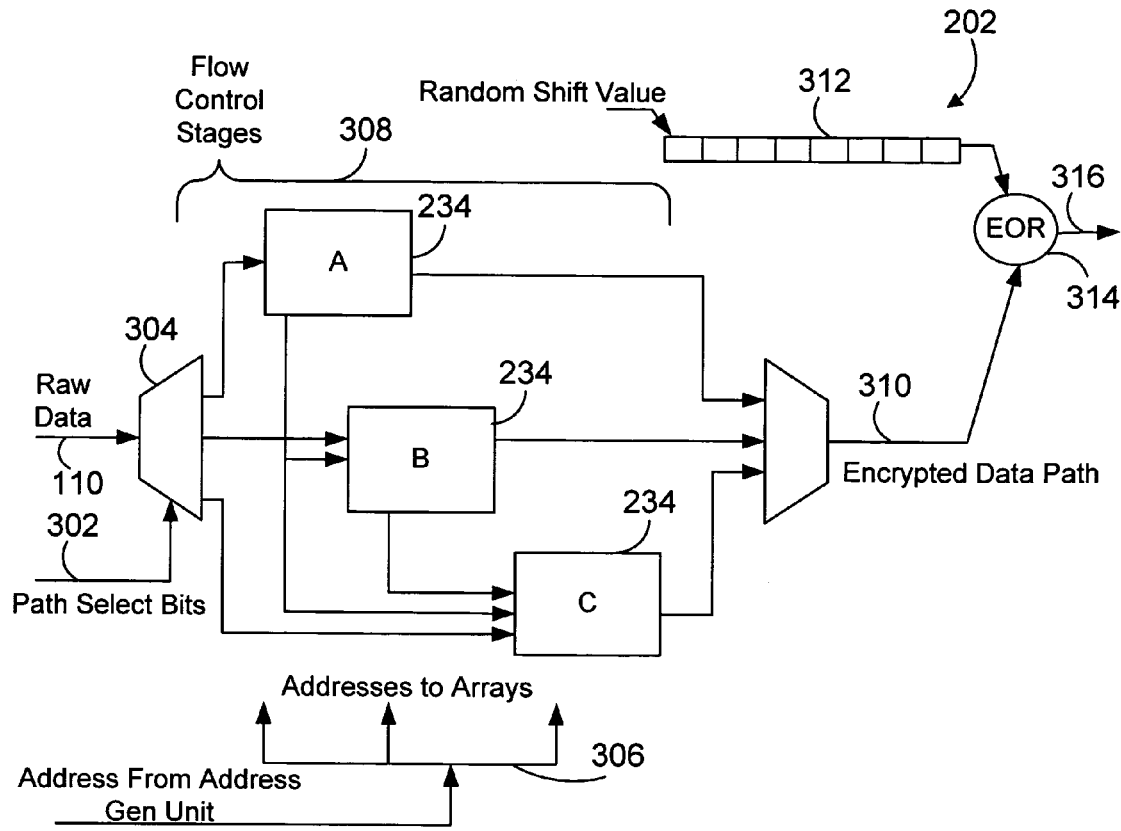
FIG. 3 is a block diagram of the encryption path in accordance with the preferred embodiments.

FIG. 3 shows a block diagram of the encryption path 202 introduced in the description of FIG. 2 according to a preferred embodiment. FIG. 3 illustrates merely one of many possible encryption schemes known or developed in the future that could be used in a memory controller with performance modulated security according to the preferred embodiments described herein.

In encryption path 202 show in FIG. 3, Raw data is introduced from the unit bus 110 which comes from a unit transferring data through the memory controller in route to the external memory bus. The encryption process utilizes a set of values during its processing provided by the flow path controls 236 shown in FIG. 2 to select a path through the encryption arrays 234. As data comes in, the encryption of that data is accomplished by using the data to access the encryption arrays 234, in a sequence (or path) controlled by the path select bits 302 controlling the input mux 304. These path select bits 302 are randomized and also can be limited in range by the performance monitor 206 shown in FIG. 2. For each access to the encryption arrays 234, the addresses to those arrays are the raw data in addition to addresses 306 generated by the address generator unit 238 shown in FIG. 2.

Again referring to FIG. 3, the paths possible through the arrays are indicated under the brackets delineating the flow control stages 308. As values from the encryption arrays are produced, these new values may be (depending on the path chosen) combined with the next stage's values from its array until the path encrypted data 310 is produced as shown in FIG. 3.

In preferred embodiments, the path encrypted data 310 is then further encrypted using an algorithm coefficient. The algorithm coefficient is produced by an algorithm coefficient shifter, based on a random shift value provided by the randomizer 260. The encrypted data 310 is combined with the algorithm coefficient from the algorithm coefficient shifter 312. In the illustrated embodiment, the combination is an exclusive OR function 314. The output of the exclusive OR combination 314 is the encrypted data 316 to be stored in external memory. As stated before, all the parameters (path selects, array addresses, and coefficients) used to encrypt the data are stored through the encryption parameters register to the encryption parameters array to be used later when the data is to be decrypted.

Figure 4:
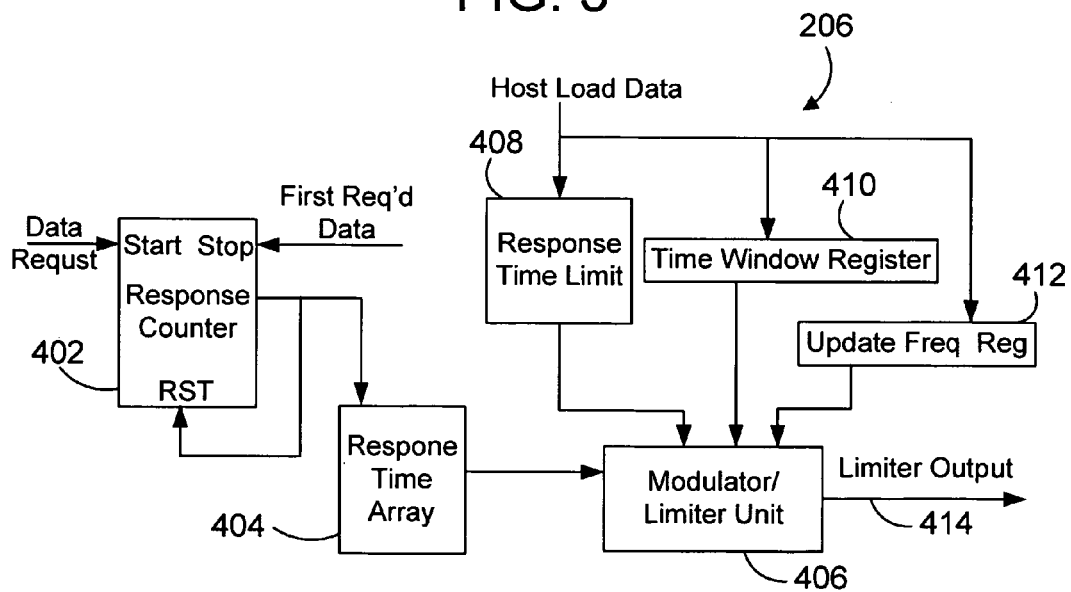
FIG. 4 is a block diagram of the performance monitor in accordance with the preferred embodiments.

FIG. 4 illustrates further detail of the performance monitor 206. The performance monitor 206 monitors the performance of the memory controller's 104 access to the external memory bus 116. The performance monitor tracks the response time over a defined time window. The response times (or wait times) are then compared to predefined allowable response time for each unit. This comparison is also done over a predefined window of time. When the actual response times exceed the units' allowable response time limits, the level of encryption is limited until performance parameters fall within the limits selected by the host processor. The frequency with which the encryption mechanism is adjusted is also selectable and predefined by the host processor. Data transfers continue as the controller monitors system performance and controls the level of security applied to the data according to that performance data. The host controller can adjust the allowable response times depending on what unit is accessing the memory through the memory controller.

Again referring to FIG. 4, the performance monitor 206 includes a response counter 402 that monitors the response time for the memory controller to access external memory. The response counter 402 starts counting when a data request is made by a unit on the unit bus, and stops when the first data from that request arrives in the memory controller. The response counter 402 outputs the response time to a response time array 404. The response time array 404 outputs stored response times to the modulator/limiter unit 406.

The controls portion of the performance monitor 206 includes a response time limit register 408, a time window register 410, and an update frequency register 412. The host may load data into the response time limit register 408, time window register 410, and update frequency register 412. These registers give the host control of how long the performance monitor will look for the memory controller 104 to take to respond to memory requests. For a specific window of time, as loaded by the host into the time window register 410, the performance monitor will check the response times of the memory controller. The performance monitor will check the response times at a frequency (or repeat rate) according to the value loaded into the update frequency register 412.

The modulator limiter unit 406 takes the inputs of the response time array 404, the response time limit register 408, the time window register 410, and the update frequency register 412 to determine when to modulate the security. The modulator limiter unit 406 outputs a limiter output signal 414 to the flow path controls through the encryption controls 230 to modulate the level of security. The modulator limiter unit 406 determines if the response times in the response time array exceed the wait time limits 408.

Figure 5:
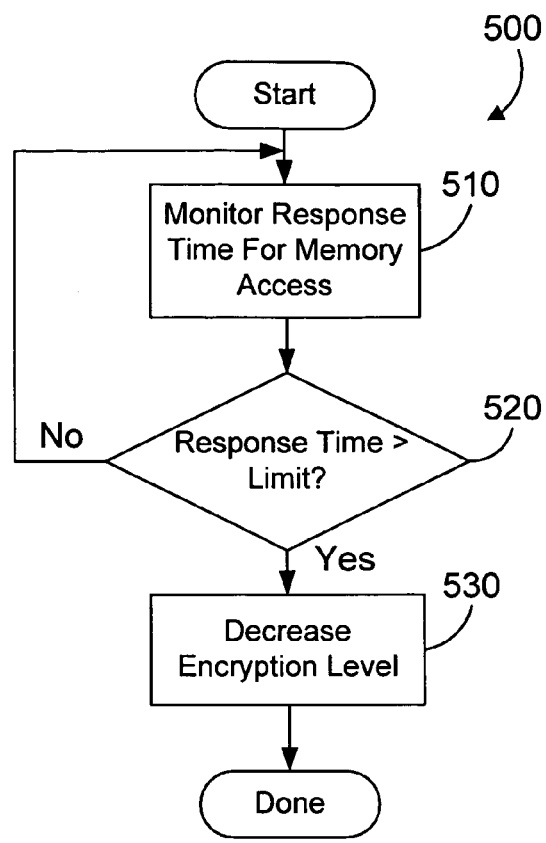
FIG. 5 is method flow diagram of the memory controller in accordance with the preferred embodiments.

Referring now to FIG. 5, a method 500 in accordance with the preferred embodiments is preferably performed by memory controller 104 shown in FIG. 1 to modulate the performance of the memory controller. This method is greatly simplified for illustration. Other methods claimed herein include other features of the described embodiments above. As used herein, performance modulation means decreasing the encryption level when memory response times are too long and increasing the encryption level when response times falls back to an acceptable level. Method 500 begins by monitoring the response time for memory access by a unit or a processor (step 510). The response time is then evaluated to see if it is greater than a predefined response time limit (step 520). If the response time is not greater than the predefined time limit (step 520=no), then the method returns to step 510. If the response time is greater than the predefined time limit (step 520=YES), the encryption level is decreased (step 530) and the method is complete.

Figure 6:
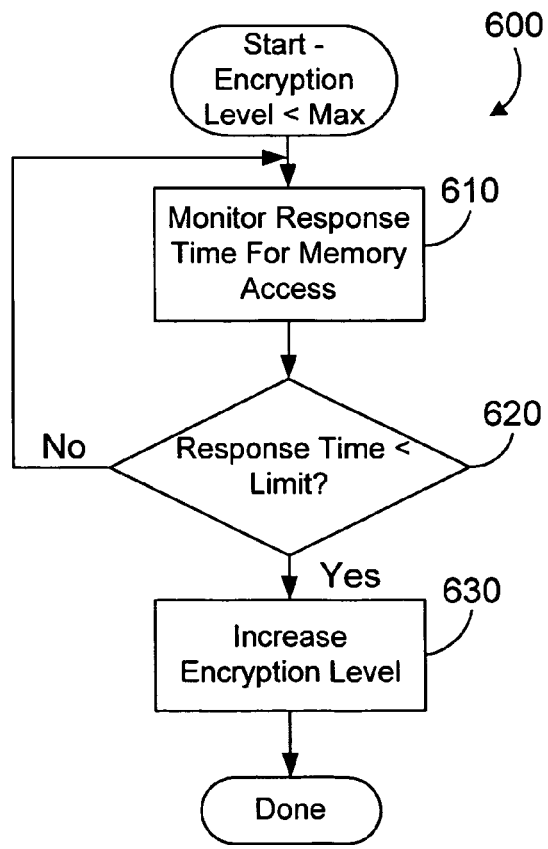
FIG. 6 is another method flow diagram of the memory controller in accordance with the preferred embodiments.

Referring now to FIG. 6, a method 600 in accordance with the preferred embodiments is preferably performed by memory controller 104 with performance modulation 106 shown in FIG. 1. This method is also greatly simplified for illustration. This method is performed when the memory controller detects that the encryption level is less than the maximum encryption level possible in the memory controller. Method 600 begins by monitoring the response time for memory access by a unit or a processor (step 610). The response time is then evaluated to see if it is less than a predefined response time limit (step 620). If the response time is not less than the predefined time limit (step 620=no), then the method returns to step 610. If the response time is less than the predefined time limit (step 620=YES), the encryption level is increased (step 630) and the method is complete.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A memory controller for controlling memory access from a processor unit to a memory comprising:
   a store path from the processor unit to the memory comprising an encryption path with an encryption circuit and an encryption bypass path;
   a read path from the processor unit to the memory comprising an decryption path and a decryption bypass path; and
   a performance modulation circuit that modulates a level of encryption in the encryption path based on a performance of the memory controller to access data from the memory by decreasing the encryption level when a memory response time is too long and increasing the encryption level when the memory response time falls back to an acceptable level.

2. The memory controller of claim 1 wherein the performance modulation circuit further comprises a performance monitor that determines a response time from the time a data request to the memory from the unit processor is made until data in response to the request arrives at the memory controller.

3. The memory controller of claim 2 wherein the performance monitor supplies the response time to a modulator limiter circuit that compares the response time to a pre-defined performance value.

4. The memory controller of claim 3 wherein the performance value includes a time window that determines the amount of time the modulator limiter circuit checks response times from the performance monitor circuit.

5. The memory controller of claim 3 wherein the predefined performance value is different depending on which one unit of a plurality of processor units are accessing the memory.

6. The memory controller of claim 1 wherein the encryption circuit further comprises multiple paths through a plurality of encryption arrays and a flow path control circuit to select a path to access the encryption arrays.

7. The memory controller of claim 6 wherein the encryption circuit further comprises an address generator circuit to generate addresses to access the encryption arrays.

8. The memory controller of claim 7 wherein the encryption circuit further comprises an encryptions parameters storage to store a flow path produced by the flow path control circuit and store addresses produced by the address generator circuit to decrypt the encrypted data when the encrypted data is read from the memory.

9. The memory controller of claim 6 wherein the encryption circuit further comprises an algorithm coefficient shifter to encrypt data from the encryption arrays by combining the data with an algorithm coefficient with an exclusive OR function.

10. The memory controller of claim 1 wherein the encryption circuit further comprises an algorithm coefficient shifter to encrypt the data by combining the data with an algorithm coefficient with an exclusive OR function.

11. A memory controller for controlling memory access from a processor unit to a memory comprising:
   a store path from the processor unit to the memory comprising an encryption path with an encryption circuit and a an encryption bypass path;
   a read path from the processor unit to the memory comprising an decryption path and a decryption bypass path; and
   a performance modulation circuit that modulates an encryption level in the encryption path based on a performance of the memory controller to access data from the memory by decreasing the encryption level when a memory response time is too long and increasing the encryption level when the memory response time falls back to an acceptable level;
   a performance monitor that determines a response time from the time a data request to the memory from the unit processor is made until data in response to the request first arrives at the memory controller and supplies the response time to a modulator limiter circuit that compares the response time to a performance value set by a host; and
   wherein the encryption circuit further comprises multiple paths through a plurality of encryption arrays and a flow path control circuit to select a path to access the encryption arrays and an address generator circuit to generate addresses to access the encryption arrays.

12. A method for controlling memory access from a processor unit to a memory, the method comprising steps of:
   storing data from the processor unit to the memory through an encryption path with an encryption circuit having multiple levels of encryption through a bypass path;
   reading data from the memory through a decryption path or a bypass path; and
   modulating an encryption level in the encryption path based on a performance of the memory controller to access data from the memory by decreasing the encryption level when a memory response time is too long and increasing the encryption level when the memory response time falls back to an acceptable level.

13. The method of claim 12 further comprising the step of measuring a response time from the time a data request to the memory from the unit processor is made until data in response to the request arrives at the memory controller.

14. The method of claim 13 further comprising the step of supplying the response time to a modulator limiter circuit that compares the response time to a predefined performance value.

15. The method of claim 14 wherein the predefined performance value includes a time window that determines the amount of time the modulator limiter circuit checks the response times from the performance monitor circuit.

16. The method of claim 14 wherein the predefined performance value includes an update frequency register to set a frequency the modulator limiter circuit checks a response times from the performance monitor circuit.

17. The method of claim 12 wherein modulating the encryption further comprises selecting one of multiple paths through a plurality of encryption arrays with a flow path control circuit.

18. The method of claim 17 further comprising the step of generating addresses to access the encryption arrays in addition to using the data as an address to the arrays.

19. The method of claim 18 further comprises storing the path used to access the arrays and storing the addresses used to access the arrays in order to decrypt the encrypted data when the encrypted data is read from the memory.

20. The method of claim 12 wherein further comprising the step of using an algorithm coefficient shifter to encrypt the data by combining the data with an algorithm coefficient provided by a randomizer with an exclusive OR function.

* * * * *